(12) United States Patent
Randell et al.

(10) Patent No.: US 9,324,091 B2
(45) Date of Patent: Apr. 26, 2016

(54) LOCATION BASED MOBILE USER SELECTED TIME, LOCATION, AND NUMBER LIMITED AUTOMATIC LOCATION BASED RESERVE AND REDEEM DISCOUNTS ON PRODUCTS OR SERVICES WITH AUTOMATIC SECURITY AND FEEDBACK FEATURES

(71) Applicants: Jason Matthew Randell, Austin, TX (US); Matthew Duane Swezey, Austin, TX (US)

(72) Inventors: Jason Matthew Randell, Austin, TX (US); Matthew Duane Swezey, Austin, TX (US)

( * ) Notice: Subject to any disclaimer, the term of this patent is extended or adjusted under 35 U.S.C. 154(b) by 197 days.

(21) Appl. No.: 14/103,484

(22) Filed: Dec. 11, 2013

(65) Prior Publication Data

US 2015/0161643 A1    Jun. 11, 2015

(51) Int. Cl.
*G06Q 30/02* (2012.01)
*H04W 4/20* (2009.01)
*H04M 3/487* (2006.01)
*H04W 4/02* (2009.01)
*H04M 3/42* (2006.01)

(52) U.S. Cl.
CPC ........ *G06Q 30/0225* (2013.01); *G06Q 30/0224* (2013.01); *G06Q 30/0235* (2013.01); *G06Q 30/0261* (2013.01); *G06Q 30/0269* (2013.01); *G06Q 30/0239* (2013.01); *G06Q 30/0259* (2013.01); *H04M 3/42348* (2013.01); *H04M 3/4878* (2013.01); *H04W 4/02* (2013.01); *H04W 4/206* (2013.01)

(58) Field of Classification Search
CPC ................................................. G06Q 30/0261
USPC .......................................................... 705/14.1
See application file for complete search history.

(56) References Cited

U.S. PATENT DOCUMENTS

| | | | |
|---|---|---|---|
| 6,493,110 B1 | 12/2002 | Roberts | |
| 6,882,442 B2 | 4/2005 | Roberts | |
| 8,073,460 B1 * | 12/2011 | Scofield et al. | 455/456.1 |
| 8,135,624 B1 * | 3/2012 | Ramalingam et al. | 705/26.1 |
| 8,311,845 B2 * | 11/2012 | Vengroff et al. | 705/1.1 |
| 8,355,948 B2 | 1/2013 | Mason | |
| 8,494,901 B2 | 7/2013 | Magadi et al. | |
| 8,650,072 B2 * | 2/2014 | Mason et al. | 705/14.1 |
| 2008/0242317 A1 | 10/2008 | Abhyanker et al. | |
| 2009/0265234 A1 * | 10/2009 | Harris | 705/14 |
| 2011/0093326 A1 | 4/2011 | Bous et al. | |
| 2011/0238476 A1 | 9/2011 | Carr et al. | |
| 2012/0220314 A1 | 8/2012 | Altman et al. | |
| 2012/0284102 A1 | 11/2012 | Shave et al. | |
| 2013/0041737 A1 | 2/2013 | Mishra et al. | |
| 2013/0046590 A1 * | 2/2013 | Abraham et al. | 705/14.1 |

* cited by examiner

*Primary Examiner* — Steven Lim
*Assistant Examiner* — Benyam Haile
(74) *Attorney, Agent, or Firm* — Peter B. Scull; Hamilton DeSanctis & Cha LLP

(57) ABSTRACT

Methods, systems, software, computer readable non-transitory media, applications, devices, and the like for providing location based, mobile, user selected, time, location, and number limited or unlimited electronic coupon card selection of automatic location based reserve and redeem discounts on products or services with a profile picture, tag, motion enabled watermark, or other visual, 2D or mechanism for security purposes.

18 Claims, 8 Drawing Sheets

US 9,324,091 B2

LOCATION BASED MOBILE USER SELECTED TIME, LOCATION, AND NUMBER LIMITED AUTOMATIC LOCATION BASED RESERVE AND REDEEM DISCOUNTS ON PRODUCTS OR SERVICES WITH AUTOMATIC SECURITY AND FEEDBACK FEATURES

PRIORITY CLAIM

This application does not claim priority to prior applications.

FIELD OF TECHNOLOGY

This disclosure relates generally to the technical fields of communications and, in one exemplary optional embodiment, to a methods, systems, software, computer readable non-transitory media, applications, devices, and the like for providing location based, mobile user selected, time, location, and number limited electronic coupon card selection of automatic location based reserve and redeem discounts on products or services with profile picture, tag, motion enabled watermark, or other visual, 2D or other mechanism for security.

BACKGROUND

Financial credit and processing companies attempt to differentiate themselves by offering discounts to customers at particular merchants for using their credit card or payment systems, e.g., by offering a 1% rebate on monthly or yearly purchases over $5000. By employing this method, the financial company incentivizes end users to use their credit and/or payment services over competitors. This method of promotion also tends to increase the amount of credit held by the end user to the financial benefit of the financial company. However, such practices do not necessarily benefit particular merchants. Specifically, the merchant is forced to attempt to offer discounts directly to consumers, which is logistically difficult and costly to the merchant. In a better scenario, the merchant would benefit more by offering discounts only to customers that qualify for a discount based on what that customer is interested in and the location of that customer relative to the merchant. However, this process is generally difficult and costly for the merchant.

For example, a potential customer for the merchant can optionally travel to, or be shopping in, a particular city. The potential customer can optionally not know what potential products he or she is looking for. As a result, the potential customer can optionally prefer to walk or drive around the streets of the city in order to see if there is a merchant he might be interested in.

While merchants can optionally be offering mobile rebates to consumers directly on their mobile device, whereby the consumer would be pushed a virtual coupon to their mobile device and then the consumer would then present this coupon for a rebate to the merchant. This method of promotion has not worked well since using the virtual rebate is difficult for the consumer, the clerk, and the merchant. The consumer finds it difficult to locate the merchant or communicate the rebate to the clerk in the shop and the merchant Point of Sale (POS) systems are not equipped to handle such types of rebates in an easy fashion. Thus, there is a need to improve the ability of merchants to offer rebates or other incentives to lure customers into their retail stores, as well as provide offers to location based customers.

SUMMARY

The invention provides in non limiting optional embodiments, a location based, mobile, user selected time, location, and number limited or unlimited, automatic location based reserve and redeem discounts/offers on products or services with profile picture, tag, motion enabled watermark, or other visual, 2D or security mechanism.

The invention provides in non limiting optional embodiments, methods, systems, software, non-transitory computer readable non-transitory media, applications, devices, and the like for reserving a discount on a product or service at a physical location, optionally based on location or geospatial environment.

The invention optionally provides one or two or more coupons, discounts, sales, and/or deals (hereinafter, "coupon") available to reserve and redeem, wherein a user reserves a time limited nearby or location based deal by browsing through the deal cards on the display of an internet device (e.g., but not limited to a smart phone) and tapping or designating the deal they are interested in reserving that is nearby or at a designated location and has a time limit on purchasing the product or service. The invention optionally includes one or more of the following steps or components: (i) Designating the deal card displays the deal detail view which optionally includes a way to reserve the deal. (ii) When the user taps the reserve button the system checks that the user hadn't already reserved the deal and that there is still a reservation available. (iii) If there is a reservation available, the system creates a reservation record associated with the user and the deal. (iv) The reservation record optionally includes created at and/or expires at timestamps. (v) The user interface of the application tells the user how much time they have to redeem their reservation and their distance from the physical location of the deal. (vi) The user cannot leave the reservation screen (to reserve another deal) unless they cancel their current reservation (which will be released back into the available reservation pool). (vii) The expires at time can be extended by various actions taken by the users, including but not limited to sharing the deal with friends or posting a photo to social media. (viii) To redeem the reservation the user must be within a certain distance of the deal's physical location (geo fence) before the reservation expires at time has passed, and/or optionally with other types of location services or mechanism, e.g. mobile device locating systems, such as but not limited to, global positioning systems (GPS), global navigation satellite systems (GNSS), wireless or cell phone tower positioning or locating; including or additional to international standard IS)/IEC 24730 and/or on real time locating systems (RTLS); indoor positioning systems (IPS), e.g., iBeacon™ (Apple, Inc.); Bluetooth™, universally unique identifiers, radio frequency identification (RFID); ultrawide band (UWB); infrared (IR), visable light communication (VLC); ultrasound, and/or any known suitable system and the like. (ix) If the application is open and running it will show the user their distance and time remaining. If the application is closed or in the background, a geofence will send a local notification to the user when they have arrived at the location if the reservation time hasn't expired. Once the user is within the allocated distance to redeem and the reservation hasn't expired, it will automatically check them in and mark the deal as "redeemed" enabling the user to prove they made it on time even if there isn't staff available to verify the on time arrival. The proof of redemption will include a security/identification feature, e.g., profile picture, tag, motion enabled watermark, or visual, 2D tag, or URL code security, of the user to prevent fraud. If the user fails to get near enough to the deal location before a preset or adjusted time period expires, the reservation will expire and the go back into the available reservation pool.

In addition, the method can optionally include automatically attaching a present location data (e.g., the present location data can optionally be a textual data, a visual data, an auditory data, a video data and/or an audio-visual data surrounding a place presently being perceived by user the of the mobile device) in the present location profile when the user selects a capture function in the present location profile. The method can optionally further include providing a wiki interface that can optionally enable the user of the mobile device to add profiles and/or to modify any information associated with the present sense profile and/or the set of adjacent profiles when the present sense profile and the set of adjacent profiles (e.g., the present location profile and the set of adjacent profiles can optionally include both residential and business listings) can optionally not be claimed by another user.

The invention can optionally further provides one or more or any combination of:

(A) multiple, sets, or single deals available to reserve and redeem;
(B) deals having a limited quantity of reservations available;
(C) the ability for the user to reserve a deal by browsing through deal cards and tapping the deal they are interested in reserving;
(D) tapping the deal card to display the deal detail view which optionally includes a "Reserve" button or voice input (e.g., voice activation or command, e.g., Siri™, and the like);
(E) the system checking that the user hadn't already reserved the deal and that there is still a reservation available;
(F) the system creating a reservation record associated with the user and the deal, including "created at" and "expires at" timestamps.
(G) the user interface of the application telling the user how much time they have to redeem their reservation and their distance from the physical location of the deal;
(H) wherein the user cannot leave the reservation screen (to reserve another deal) unless they cancel their current reservation (which will be released back into the available reservation pool).
(I) wherein the expires at time can be extended by various actions taken by the users, including but not limited to sharing the deal with friends or posting a photo to social non-transitory media.
(J) wherein, to redeem the reservation, the user must be within a certain distance of the deal's physical location (geo fence) before the reservation expires at time has passed.
(K) wherein, if the WF application is open and running, it will show the user their distance and time remaining
(L) wherein if the application is closed or in the background, a geofence will send a local notification to the user when they have arrived at the location if the reservation time hasn't expired.
(M) wherein, once the user is within the allocated distance to redeem and the reservation hasn't expired, it will automatically check them in and mark the deal as "redeemed" enabling the user to prove they made it on time even if there isn't staff available to verify the on time arrival.
(N) wherein the proof of redemption will include a profile picture, tag, motion enabled watermark, or other visual, 2D or security mechanism, of the user to prevent fraud; and/or (O) wherein, if the user fails the get near enough to the deal location before the expires at time, the reservation will expire and the go back into the available reservation pool.

A method, non-transitory computer media, or system is optionally provided for providing location based, mobile device, user selected time, location, and number limited automatic location based reserve and redeem discounts using electronic coupon cards for products or services with profile picture, tag, motion enabled watermark, or other visual, 2D or security mechanism, the method comprising three or more of the following steps and/or features or elements:

(a) electronically communicating via a network comprising a wireless network positioning data of the mobile device to non-transitory media on a computer based server at a periodic interval;
(b) automatically and electronically generating via a processor in the mobile device, in response to electronic communications data from the server, present location profile data associated with a present geographic location of the mobile device;
(c) automatically and electronically generating via a processor in the mobile device or the server, in response to electronic communications data from the server, user profile data associated with the user of the mobile device,
wherein the user profile data comprises a picture of the user and profile information of the user that is used by the server to determine, using a subroutine, types of products or services of potential interest to the user;
(d) simultaneously and electronically generating via a processor in the mobile device, a set of data of adjacent location profiles of nearby businesses provided by the server as being geographically near to the present geographic location of the mobile device;
(e) electronically refreshing, in the mobile device and the server, present location profile data and the set of adjacent location profiles at constant, predetermined, refreshed or periodic intervals;
(f) electronically generating, in the mobile device and the server, an electronic or graphical representation of a limited number of reservations in a reservation pool for each coupon card for discounts on the products or services of potential interest to the user or other users,
wherein one of more of each discount provided by a coupon card is reservable by one or multiple users of mobile devices, and is reservable by the user of the mobile device, optionally using a time limit or period for redeeming or buying product by tapping the display of the coupon card displayed on the one of the multiple users' or the user's mobile device;
wherein the discounts on the coupons provided to the user are provided to the multiple users in a preset, limited number of reservable coupons;
wherein the coupon cards displayed to the user of the mobile device have a display of a reserve button for the user to push on the touch screen of the mobile device to reserve the coupon for a preset period or periods of time,
wherein the user can select only one coupon reservation at a time, wherein any non-selected or additional coupon reservation will be returned to the reservation pool upon selection of the reservation of one of the coupon cards and coupon;
wherein said time is date stamped or displayed on the display of the users' mobile device as created/begun and limit/expiration times, wherein the limit/expiration time determines by which time the product or service has to at least one, or one or more of: (i) be purchased by the user; (ii) shared with friends or posted to social media; or (iii) the user has to arrive at a business in a vicinity of the present geographic location of the mobile device; in order for the user to receive the 0-100 percent discount on the coupon for the product or service;

wherein the coupons cards are for discounts on one or more of at least 1, 2, 3, 4, 5, 10, 15, 20, 25, or more products or services;

wherein the coupon cards are displayed in the form of coupon cards on a touch screen display of the mobile device for the user to view and select from by touching the screen of the display of the mobile device one or more selected coupons, wherein the coupons providing a discount on the desired products or services are sold by the business in a vicinity of the present geographic location of the mobile device;

(g) electronically reserving on the mobile device the coupon through a mobile application or routine on the mobile device when the user views and selects the coupon for a product or service associated with the coupon;

(h) electronically reserving the product or service at the business in the vicinity of the present geographic location of the mobile device;

wherein the mobile device displays the time limit for purchasing the product or service, which selected coupon is then associated with a user profile having a picture of the user;

wherein the reservation for the coupon expires if the user does not arrive at a preset distance from the business, or purchase the product or service, before the limit/expiration time;

(i) electronically notifying the user when the user is within a preset distance of the location of the business selling the product or service corresponding to the coupon selected by the user;

(j) electronically redeeming on the mobile device or a computer system of the business the coupon through an electronic payment system provided either on the mobile device or by the business, when the user purchases the product or service associated with the coupon providing the associated discount in price for the product or service when the user purchases the product or service within the time limit which was displayed on the device when the user selected the coupon;

wherein the discount provided by the coupon for the user of the coupon is validated by use of the user's profile picture, tag, motion enabled watermark, or other visual, 2D or security mechanism, by the business selling the product or service, optionally further or alternatively comprising one or more alternative verification, e.g., but not limited to, any known method, e.g., communication device ID, security information, unique identifier, voiceprint, fingerprint, motion enabled watermark, password, code, user ID verification data, and the like.

The method, non-transitory media or system can optionally further include generating directions between the mobile device and an adjacent business location offering one or more of said coupons without requiring a user of the mobile device to enter a starting address by applying a directions algorithm based on the positioning data of the mobile device as the starting address and a destination address identified in a particular adjacent profile associated with the adjacent business location. Moreover, the method can optionally include viewing the present location profile and the set of adjacent location profiles of the mobile device in a satellite mode, a three-dimensional mode, and a flat two dimensional (2D) map mode or a text mode.

The method, non-transitory media or system can optionally further include automatically attaching present location data in the present location profile when the server selects coupon cards based on location to be displayed on the mobile device that are nearby the location of the mobile device; and or wherein the coupons do not display and/or offer at least one selected from one or more of bidding for online auctions, rebates on products or services, travel, hotel, motel, or vehicle rental reservations, or online products or services that are not sold in the vicinity of the mobile device.

The method, non-transitory media, or system can optionally also include creating a temporary message through the mobile device that is coordinated based on the positioning information of the mobile device to a geo-spatial network location and which resides in the geo-spatial network only for a threshold amount of time prior to being purged from the geo-spatial network; and generating a marker visible around profiles of adjacent businesses and residences in the geo-spatial network that represents the temporary message.

In another aspect, the method, non-transitory media, or system optionally includes a server to simplify a geo-spatial network to operate through a mobile communications infrastructure, in which profiles of the geo-spatial network can optionally be editable by any user of the geo-spatial network until they are claimed by a user of the geo-spatial network, and a mobile device to generate a view of profiles of the geo-spatial network that can optionally be a threshold radius away from the mobile device and to automatically capture content to be appended to wiki profiles of the geo-spatial network by attaching a location data of the mobile device acquired through a positioning module of the mobile device with a particular wiki profile of the geo-spatial network. Furthermore, the method, non-transitory media, or system can optionally include an advertising coupon card module (as, and/or, one or more advertising modules) to capture advertisements, messages, and/or coupons from businesses and residents surrounding the mobile device and to share them with a user of the mobile device.

The method, non-transitory media, or system can optionally include wherein said method further comprises electronically sending via web or email coupons or discounts to said user based on one or more of the user's redemption history, demographics and taste.

The method, non-transitory media, or system can optionally further include providing to one or more of said users at least one of an aggregate savings calculator and a leaderboard that track other of said users and shows relative quantitative use of the method. The savings calculator or calculation can optionally include one or more of use of the value of product or services such as one or more of manufacturer's suggested retail price (MSRP), actual price when sold, a discounted price, perceived value, average price, and the like. The leaderboard can optionally provide one or more of two or more users's relative average, actual, calculated or perceived savings based on one or more of the savings calculator, a separate calculation by one or more of at least one merchant, a service provider, the issuer of the discount, a web based data calculation, a program or app on one or more users' mobile device or computer, which discount can optionally be based at least in part on one or more of value of one or more products or services based on one or more of published prices, manufacturer's suggested retail price (MSRP), actual price when sold, a discounted price, perceived value, average price, and the like.

The system can optionally further comprise a computer based network server and at least one mobile device operating through a mobile communications infrastructure, in which user profiles of network users of the network are editable by any network user; and mobile device used by network users that to generate a location profiles of the users and location and product and service profiles of businesses that the server can associate, including a threshold radius away from the mobile device location and the business locations and product and services by attaching location data of the mobile device acquired through a positioning module of the mobile device through the network; the server or mobile device comprising an advertising coupon card module (advertising module) to capture or generate coupons from businesses and residents surrounding the mobile device and to share them with a user of the mobile device an electronic electronically communicating via a network comprising a wireless network positioning data of the mobile device to non-transitory media on a computer based server at a periodic interval; and at least one processor in the mobile device or server that optionally provides one or more steps, elements or features as described herein or as known in the art.

In yet another aspect, a method optionally includes sharing a present location of mobile users of a geo-spatial network with other users through markers corresponding to a latitude and longitude position of mobile devices associated with the mobile users in a three-dimensional neighborhood view, appending content to profiles of the geo-spatial network based on a written, an audio, and a video content provided through the mobile devices associated with the mobile users, and/or automatically providing editable business and/or residential profiles that have not been claimed surrounding the mobile devices to the mobile devices so that the mobile users of the mobile devices have an ability to modify the editable business and/or residential profiles. In addition, the method can optionally include associating a three-dimensional neighborhood data with each profile using an interpolation algorithm to match each profile to a specific neighborhood in the three-dimensional neighborhood data.

The methods, systems, and apparatuses disclosed herein can optionally be implemented in any means for achieving various aspects, and can optionally be executed in a form of a computer system-readable non-transitory medium embodying a set of instructions that, when executed by a computer system, cause the computer system to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows:

DETAILED DESCRIPTION

A method, apparatus and system of mobile content creation, sharing, and commerce in a geo-spatial environment are disclosed. The invention provides in non limiting optional embodiments, a location based, mobile, user selected time, location, and number limited, automatic location based reserve and redeem discounts on products or services with profile picture, tag, motion enabled watermark, or other visual, 2D or security mechanism The invention provides, in non limiting optional embodiments, methods, systems, software, non-transitory computer readable non-transitory media, applications, devices, and the like for reserving a discount on a product or service at a physical location, based on location or geospatial environment. In the following description, for the purposes of explanation, numerous specific details are set forth in order to provide a thorough understanding of the various embodiments. It will be evident, however, to one skilled in the art that the various embodiments can optionally be practiced without these specific details.

In one optional embodiment, a method optionally includes communicating a positioning data of a mobile device to a server at a periodic interval, automatically generating in the mobile device, in response to the server, a present location profile associated with a present geographic location of the mobile device, simultaneously generating, in the mobile device, a set of adjacent profiles provided by the server as being a geographically near to the present geographic location of the mobile device, and refreshing in the mobile device, the present location profile and/or the set of adjacent profiles at the periodic interval or intervals.

In another optional embodiment, a system optionally includes a server to simplify a geo-spatial network to operate through a mobile communications infrastructure, in which profiles of the geo-spatial network, and a mobile device to generate a view of business coupon cards of the geo-spatial network that are a threshold radius away from the mobile device and to automatically capture content to be appended to profiles of the geo-spatial network by attaching a location data of the mobile device acquired through a positioning module of the mobile device with a particular wiki profile of the geo-spatial network.

Figure 1:
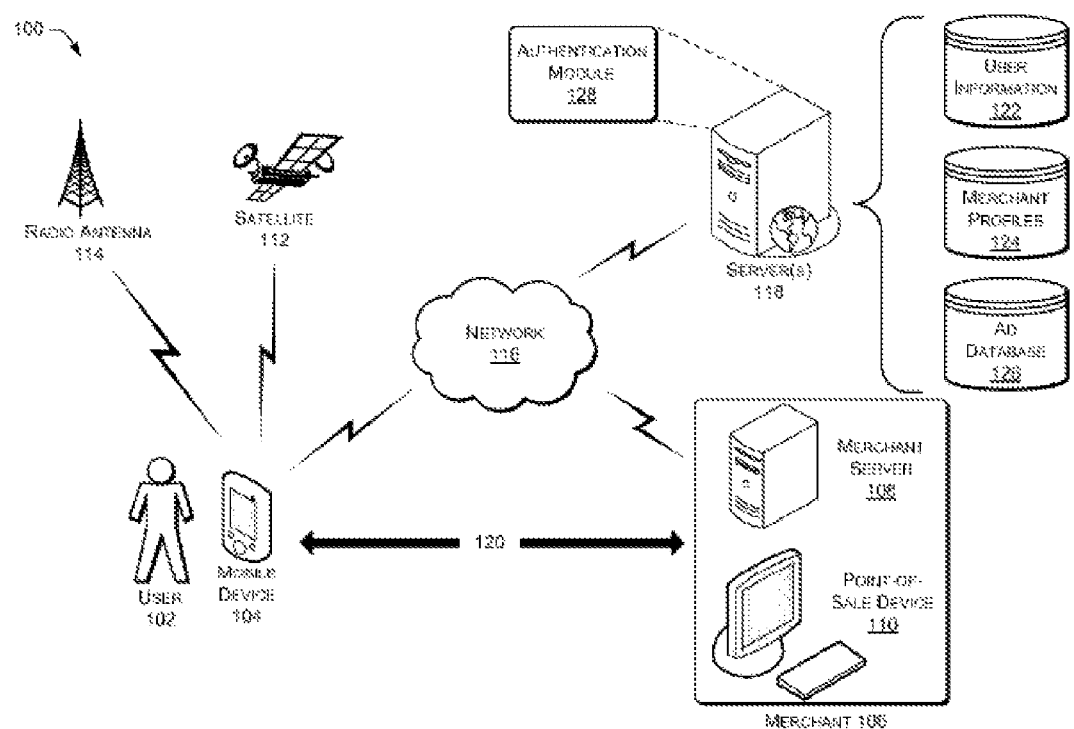
FIG. 1 shows an illustrative architecture for facilitating efficient transactions between a user of a mobile device and a merchant based on the geolocation of the mobile device.

FIG. 1 shows an illustrative architecture 100 in which a representative user 102 employs a mobile device 104 to interact with electronic coupons of a merchant 106. The merchant 106 may comprise a point-of-sale device 110 and a server 108 can be provided to handle network communications between the user, the server, and to access merchant data. In some implementations, there may be one or more servers 108 for several mobile devices. The server 108 may also include applications that manage interactions between the merchant 106 and the mobile device 104. The applications can optionally include applications that provide one or more of suitable coupon cards, regulate point-of-sale transactions, online transactions, the provisioning of advertisements, promotions, information, and the like. The server 108 may also store customer information about past or potential future customers. In some implementations, the customer information can optionally comprise information such as personal information about the customer, customer preferences, and the like.

The mobile device 104 may be implemented as any number of mobile devices, including but not limited to a mobile phone, a personal digital assistant (PDA), a laptop computer, a net book, an eBook reader, a personal media player (PMP), a portable gaming system, an automobile navigation system, and so forth. The device 104 is location aware, or is able to provide information to another entity (e.g., a server) to allow the other entity to determine a location of the device 104. A location on the surface of the earth, or a "geolocation," may be provided to the device by a satellite 112 such as a GPS satellite. Alternatively, wireless signals such as from a radio antenna 114 may be used to determine a geolocation of the device 104 relative to a known position of the radio antenna 114. Other technologies and methods for determining geolocation are also envisioned within the scope of this disclosure such as, for example, calculating geolocation based on a network access point (e.g., Wi-Fi hotspot) or from a locator signal broadcast from a known location, such as at the merchant 106.

The mobile device 104 and the merchant 106 may connect to a network 116. The network 116 may include any one or combination of multiple different types of networks, such as cable networks, local area networks, personal area networks, wide area networks, the Internet, wireless networks, ad hoc networks, mesh networks, and/or the like. In some implementations the satellite 112 and/or the radio antenna 114 may provide network connectivity to the mobile device 104 as well as provide geolocation. For example, the radio antenna 114 may provide network access to the mobile device 104 according to the International Mobile Telecommunications-2000 standards ("3G network") or the International Mobile Telecommunications Advanced standards ("4G network"). Other implementations may include one source of geolocation data such as the satellite 112 and a separate source of network connectivity such as a Wi-Fi hotspot. The merchant 106 may connect to the network 116 through the merchant server 108 using any suitable mechanism such as a wired or wireless connection.

A one or more servers 118 may also be connected to the network 116 and configured to manage interaction between the mobile device 104 and server 118 and/or the merchant 106. In some implementations, all or part of the interaction between the mobile device 104 and the merchant 106 may be through a direct communications link 120 without passing through the server 118 or the network 116. The direct communication link 120 may be implemented by radio transmissions (e.g., IEEE 802.11, Bluetooth), infrared signals, radio frequency identification (RFID), magnetism (e.g., magnetic strips such as used on credit cards), display of a code on the device 104 to a human operator or to a scanning device at the merchant 106, and/or any other method of directly passing information between the mobile device 104 and the merchant 106.

The server(s) 118 may house or otherwise have a connection to multiple data stores including user information 122, merchant profiles 124, an advertisement ("ad") database 126, and/or other data stores. Generally, the user information 122 contains information about the user 102 associated with the mobile device 104. The user information 122 enables efficient and personalized interaction between the user 102 and the server 118 and/or the merchant 106. The merchant profiles 124 generally contain information about one or more merchants including the merchant 106 with which the user 102 is interacting. One type of interaction between the merchant 106 and the user 102 is advertising in the form of limited reservable coupons provided about the merchant 106 to the device 104. Information for generating relevant advertisements in the form of discount coupons may be contained in the advertisement database 126. Each of the data stores will be discussed in greater detail below.

The server(s) 118 may also comprise an authentication module 128 that compares login information from the mobile device 104 and/or the merchant 106 to confirm that the correct user information 122, merchant profiles 124, advertisement database 126, and other information is correctly correlated with the right entity (e.g., user 102 and/or point-of-sale device 110). The authentication module 128 will be discussed in greater detail below.

Illustrative Mobile Device

Figure 2:
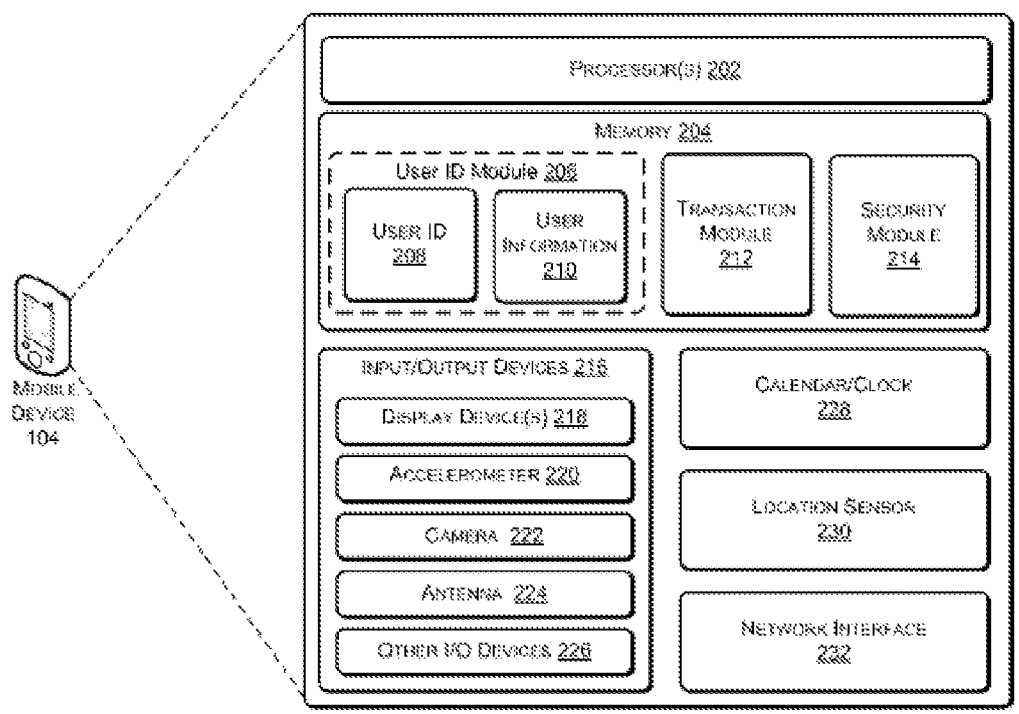
FIG. 2 shows the mobile device from FIG. 1 in greater detail.

FIG. 2 is a schematic representation of the mobile device 104 of FIG. 1. The mobile device 104 includes one or more processors 202 and a memory 204. The memory may contain a user identification module 206 that in turn contains a user identifier 208, user information 210, a transaction module 212, and a security module 214. The user identification 208 may be a unique number or code that uniquely identifies the user 102 of the mobile device 104. This user identification 208 may be the same user identification 208 that the user 102 uses for interacting with online merchants and the like. In some implementations, the user identification 208 may be entered by the user 102 into the mobile device 104 during a setup procedure such as by entering a user name and a password. In other implementations, the user identification 208 may be included in hardware of the mobile device 104. For example, a unique serial number of the mobile device 104 may be linked with a user name and password when the user 102 purchases the device 104. As a further example, a subscriber identification module (SIM) on a removable SIM card within the device 104 may contain the user identification 208. In this example, the user identification 208 may be transferred between devices by moving the SIM card.

The device 104 may also contain user information 210 stored locally in the memory 204. This information may be configurable by the user 102 and can include payment information, a home location, and/or map of the device's 104 past movements, past transaction histories, and/or any other information related to the user 102.

The transaction module 212 may recognize when the mobile device 104 is located at a merchant location and, in response, may facilitate a transaction with the merchant 106. The transaction may be based in part on the user information 210. The transaction module 212 may be configured with appropriate application programming interfaces (APIs) to establish a standard communication protocol for receiving information from the merchant 106 (e.g., merchant name and requested payment) and providing corresponding information about the user 102 (e.g., payment information and user identification 208). In some implementations, the transaction module 212 is a software application that a user 102 may install on his or her device 104 such as by downloading from a website. In other implementations, the transaction module 212 may be preinstalled by a manufacturer or retailer of the mobile device 104 and/or built into the mobile device 104 as a type of firmware or hardware. The transaction module 212 coordinates the user identification 208, user information 210, geolocation, and the like to facilitate transactions between the user 102 and the merchant 106.

There is a need to provide security in order to prevent unauthorized use of the mobile device. The security module 214 addresses this need by limiting functionality of the mobile device 104 and initiating security events in appropriate circumstances. The security module 214 may process login information, such as passwords and/or biometric information to authenticate the user 102 and prevent other people from using the mobile device 104. The security module 214 may also analyze behavior such as purchasing patterns and/or movement patterns and infer that irregular behavior may indicate fraudulent or unauthorized activity and limit device functionality accordingly, as described below in greater detail.

Mobile device 104 also includes one or more input and output devices 216. The output devices may comprise one or more display devices 218 including touch-screen displays that also function as an input device. An accelerometer 220 detects rotation or vibration of the mobile device 104. The accelerometer 220 may be a convenient mechanism for the user 102 to communicate an input to the mobile device 104 by slapping, shaking, twisting, and/or by making a motion that can be detected by the accelerometer 220. The mobile device 104 may also include a camera 222 capable of taking still or video pictures. An antenna 224 in the mobile device 104 may send and receive wireless signals from sources such as the radio antenna 114 and satellite 112. The device 104 may further comprise other input/output devices 226, such as a microphone and a speaker used, for example, in an implementation in which the mobile device 104 functions as a telephone.

In some implementations, the mobile device 104 may also include a calendar/clock 228, a location sensor 230, and a network interface 232. The calendar/clock 228 may calculate time, date, and other data that can be derived from time data and date data. In some implementations, the calendar/clock 228 may communicate with the location sensor 230 to determine, for example, day length at the current location of the device 104 based on the date. This could enable the device 104 to determine whether it is daytime or nighttime based on the time, date, and geolocation.

The calendar/clock 228 and the location sensor 230 may also communicate to create a log of where the device 104 is located at numerous time points. The log of time-place data may be compiled into a map that shows movements of the device overtime and throughout different dates. This map may be stored in the memory 204, for example as a part of the user information 210. The location sensor 230 includes any sort of system that informs the mobile device 104 of its geolocation including, but not limited to, the Global Positioning System of satellites circling the Earth. Alternatively, the location sensor may determine geolocation by radio signal triangulation (e.g., triangulation based on radio antenna signal strength).

The network interface 232 may be configured for wirelessly communicating with the network 116. The network interface 232 may use any standard protocols for network communication. The network interface 232 may be capable of high speed, wireless network communication. In some implementations, the network interface 232 may use the antenna 224 to send and receive data from the network 116. In further implementations, a network interface 232 may provide information to the location sensor 230 (e.g., a closest network access point) from which the location sensor 230 can infer or calculate a location of the mobile device 104.

Illustrative Server

Figure 3:
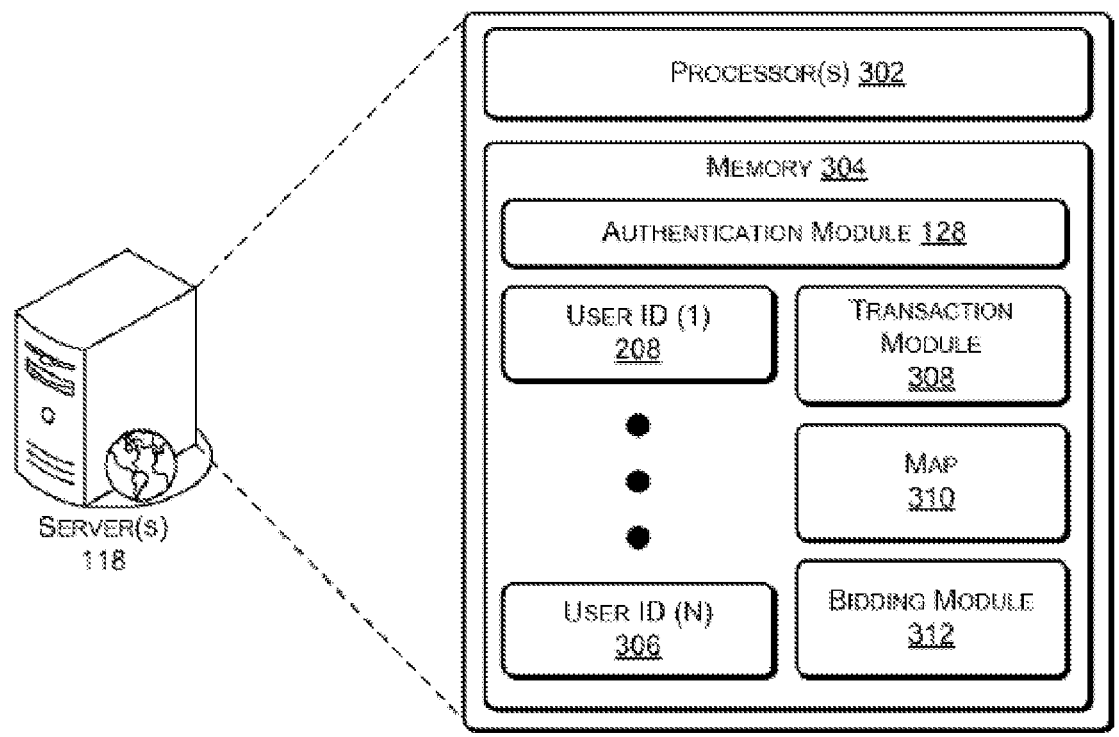
FIG. 3 shows the server(s) from FIG. 1 in greater detail.

FIG. 3 is a schematic representation of the server(s) 118 of FIG. 1. The one or more servers 118 may be implemented as a single computing device, a server farm comprising multiple servers, a distributed network, a cloud-computing configuration, and/or the like. The server(s) 118 comprises one or more processors 302 and a memory 304. The memory 304 may contain the same user identifier (1) 208 associated with the mobile device 104 FIG. 2. In some implementations, memory 304 may contain thousands or even millions of separate user identifiers represented here as User ID (N) 306 where N is any number greater than one. Each user identifier may be associated with a respective mobile device.

The user identifier 208 represents a user 104 that is interacting with the server(s) 118 via a mobile device 104. The authentication module 128 determines if communications coming from the mobile device 104 should be associated with the user identifier 208. In some implementations, authorization may involve handshaking or other verification between, for example, the authentication module 128 of the server(s) 118 and the security module 214 of the mobile device 104. The authentication module 128 may similarly authenticate the identity of merchants 106. Providing robust data security may avoid fraudulent transactions from both mobile devices 104 and merchants 106.

The server(s) 118 may also include a transaction module 308. In some implementations, the transaction module 308 on the server(s) 118 is similar to the transaction module 212 on the mobile device 104. Transactions between the user 102 and the merchant 106 may be facilitated by either or both of the transaction modules 212 and 308 when a geolocation of the device matches or is within a threshold distance of a geolocation of the merchant. The transaction module 308 may be configured with APIs for exchanging information with both the merchant 106 and the mobile device 104. In some implementations, the APIs exposed to the merchant 106 may be regulated to prevent unauthorized merchants from access in the system and to improve data security. The APIs exposed to the mobile device 104 may be generic or customized to specific device hardware and operating systems. Providing multiple sets of APIs may allow the server(s) 118 to translate communications between mobile devices 104 and merchants 106 that would otherwise not be able to exchange information.

A map 310 stored on the server(s) 118 may contain geolocations of merchants 106. Correlation between a particular merchant 106 and a particular geolocation may be used to infer that a mobile device 104 is located at or near a merchant 106 because the mobile device is located at or near a geolocation associated with that merchant 106 in the map 310. The map 310 may also contain real-time information about the geolocations of each of the mobile devices 104 associated with the respective user identifiers 208-306. From this information it may be possible to determine how many mobile devices 104 that belong to the system are present at a given merchant location. It may also be possible to identify other mobile devices 104 in proximity to a given mobile device 104.

The server(s) 118 may also facilitate advertising via advertisements sent from or on behalf of the merchant 106 to the mobile device 104. In some instances, the bidding module 312 for discount coupon cards may receive and process coupon cards for the privilege to place advertisements on mobile devices 104. Users 102 may opt in to receive coupon advertising and be presented with relevant coupon advertisements based on a geolocation of the mobile device 104 and user information 122.

Figure 4:
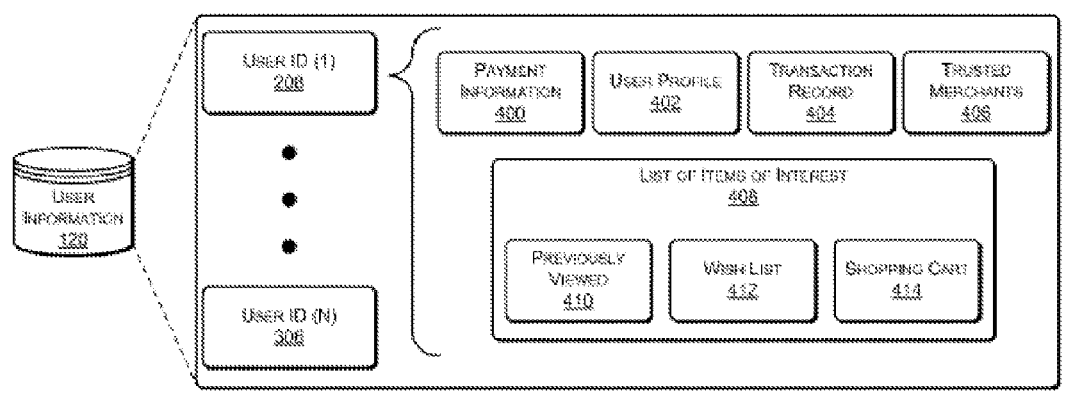
FIGS. 4 and 5 show the user information, merchant profiles, and advertisement database from FIG. 1 in greater detail.
Figure 5:
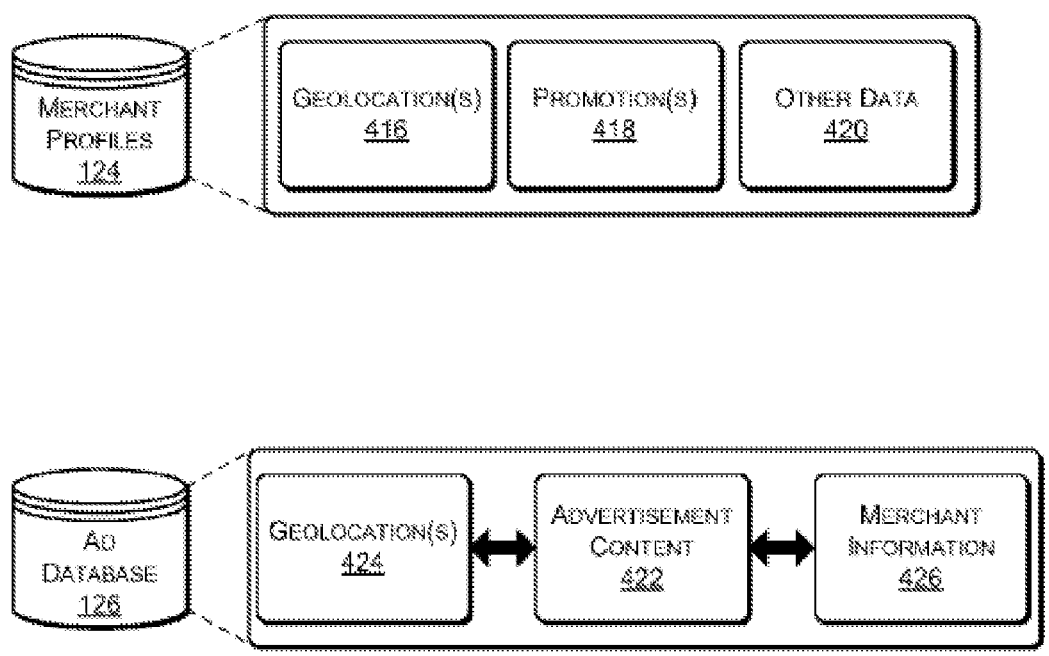

FIGS. 4 and 5 show multiple data stores including user information 122, merchant profiles 124, and an advertisement coupon database 126 that may be included within or connected to the server(s) 118. FIG. 4 shows the user information 122 which may contain some or all of the same information stored as user information 210 on the mobile device 104. In some implementations, the user information 122 stored on the server(s) 118 may be used to backup or restore the user information 210 on the mobile device 104 if, for example, the mobile device 104 is lost or damaged.

The user information 122 may provide separate data associated with each of the user identifiers 208-306 shown in FIG. 2. For example, User ID (1) 208 may be associated with payment information 400, a user profile 402, a transaction record 404, and a list of trusted merchants 406. The payment information 400 may include such things as credit card or debit card numbers, bank account information, electronic payment system information, and/or the like. The user profile 402 may contain user preferences, lists of interests and hobbies, indications of which types of communications and/or transactions the user 102 has selected to receive, personal information such as preferences for a matchmaking service, and any other type of information associated with the user 102 and his or her User ID (1) 208. The transaction record 404 may contain a list of past transaction history comprising the merchant, time, geolocation, and subject of the transaction.

The list of items of interest to the user 408 may provide a list of goods and/or services that the user 102 might wish to purchase. The user's desires may be inferred from past activity by the user 102 in which he or she explicitly or implicitly indicated an interest in some good or service. For example, a list of previously viewed goods and/or services 410 may track those web pages or good/service descriptions that the user 102 has viewed previously in a web browser or another format. More definitive indications of the user's interest may be determined by reviewing the contents of a wish list 412 that the user 102 has generated himself or herself. The user 102 may establish a wish list on multiple online retailers 126, on another location such as a personal website, etc. and all of the different wish lists may be merged into the wish list 412 stored as part of the user information 120. An even stronger indication of what the user 102 is likely to buy may be determined by viewing the contents of an online shopping cart 414. The shopping cart 414 may represent those goods or services that the user 102 has begun, but not finished, purchasing from an online retailer 126. For some online retailers 126, a shopping cart may disappear if the user 102 does not complete the purchase within a fixed period of time, but for other online retailers 126 a virtual shopping cart may persist indefinitely. A user 102 could have multiple shopping carts at various online retailers 126 each containing one or more goods or services. The shopping cart 414 included in the user information 120 may represent an aggregation of the individual shopping carts from multiple different online retailers 126.

Out of all the merchants participating in the system the user 102 may select some subset of those merchants as trusted merchants 406. In some implementations, whenever a user conducts a transaction with a merchant the user may be asked if he or she wishes to add that merchant to the list of trusted merchants. This status as a trusted merchant may be part of the user information 122. The status as a trusted merchant may enable the merchant 106 to engage in transactions with the user 102 via the user's mobile device 104. The status as a trusted merchant may also decrease the amount of interaction required from the user 102 to complete electronic transaction using the mobile device 104 as compared with other merchants that are not included on the trusted merchant list. Within the list of trusted merchants 408 different merchants may be given different trust levels by the user 102. For example, transactions with the most trusted merchants may be completed automatically merely by the user 102 (and the mobile device 104) entering a location of the merchant 106. For other merchants 106 with whom the user 102 does not desire such use of "zero-click" transactions, the user 102 may indicate a lower level of trust that requires some minimal interaction between the user 102 and the mobile device 104 in order to complete a transaction. This may be thought of as a "one-click" interaction, although the specific interaction may be something other than a "click." For other merchants that the user 102 associates with an even lower level of trust, the user 102 may require more than one click such as entry of a password and login before the mobile device 104 is enabled to complete a transaction with the merchant 106.

FIG. 5 shows the merchant profiles 122 and the advertisement database 126. The merchant profiles 124 contain information about the merchants such as geolocations 416 of the merchants' brick-and-mortar locations, promotions 418 offered by the merchant, and other data 420 about the merchant which may be used to facilitate transactions with mobile devices 104 (e.g., types of credit cards are accepted). The geolocations 416 may be one source of data used to create the map 310 stored on the server(s) 118. The promotions 418 may include things such as coupons or discounts for goods or services offered by the merchant. The promotions 418 may, for example, give a discount to a user 102 who has designated the merchant as a trusted merchant. As a further example, a merchant may provide a coupon to a user 102 of a mobile device 104 when the user enters a competitor's store.

Communication between merchants and mobile devices 104 may also include advertising. The mobile device 104 may have a user interface with a designated window or advertisement box for displaying advertisements sent from merchants, optionally wherein the advertisement can be in similar or different forms or appearances, or portions thereof and/or can be in the same form as the card. The advertisement database 126 stores advertisement content 422 such as a set of coupon cards in association with geolocations 424 and merchant information 426. Because the advertisements are targeted for mobile devices 104 which may include a location sensor 230, the advertisement content 422 is associated with one or more geolocations 424 in order to provide location-relevant advertisements. For example, advertisements for a merchant may appear when the user 102 carrying the mobile device 104 approaches the geolocations of one of the merchant's retail stores. For instance, when a user approaches a coffee shop, that coffee shop may serve an advertisement or a promotion for a discounted cup of coffee when the user is near to or is within the coffee shop, which can include a discount optionally selected from 1% to 100% off the actual or retail value or cost.

The advertisement content 422 may appear when the mobile device 104 is a predetermined distance from the merchant. In some implementations, the predetermined distance may depend upon a speed at which the mobile device 104 is traveling so that someone traveling in a moving car may receive the advertisement content 422 at a greater distance from the merchant then someone walking. In some implementations, the display of advertisements may be deactivated based on the speed at which the mobile device 104 is moving. This feature could prevent distractions to drivers by blocking advertisements, or at least placing the mobile device into a silent mode, when the speed of the mobile device 104 exceeds a speed threshold. The merchant information 426 may designate the merchant supplying the advertisement content 422. This may be used in conjunction with the user profile 404 of a user 102 to provide advertisements from merchants from which that user 102 has expressed an interest (explicitly or implicitly), while refraining from providing advertisements from other merchants. The merchant information 426 may also contain a bid amount indicating a maximum amount that the merchant is willing to bid in order to "win" and display their advertisement on the user's mobile device. This bid amount may be used by the bidding module 312 to determine which advertisement content 422 is displayed on a given mobile device 104, wherein the savings or discount can optionally be provided by one or more of discounts between 1 and 100 percent of the actual, sale or MSRP, and the like, which optionally can be processed and/or redeemed using one or more of an electronic or paper form, receipt, mobile site interaction or entry, and the like for any one or more of a product, service, goods, admission to an event, coupon, rebate, or the like.

Figure 6:
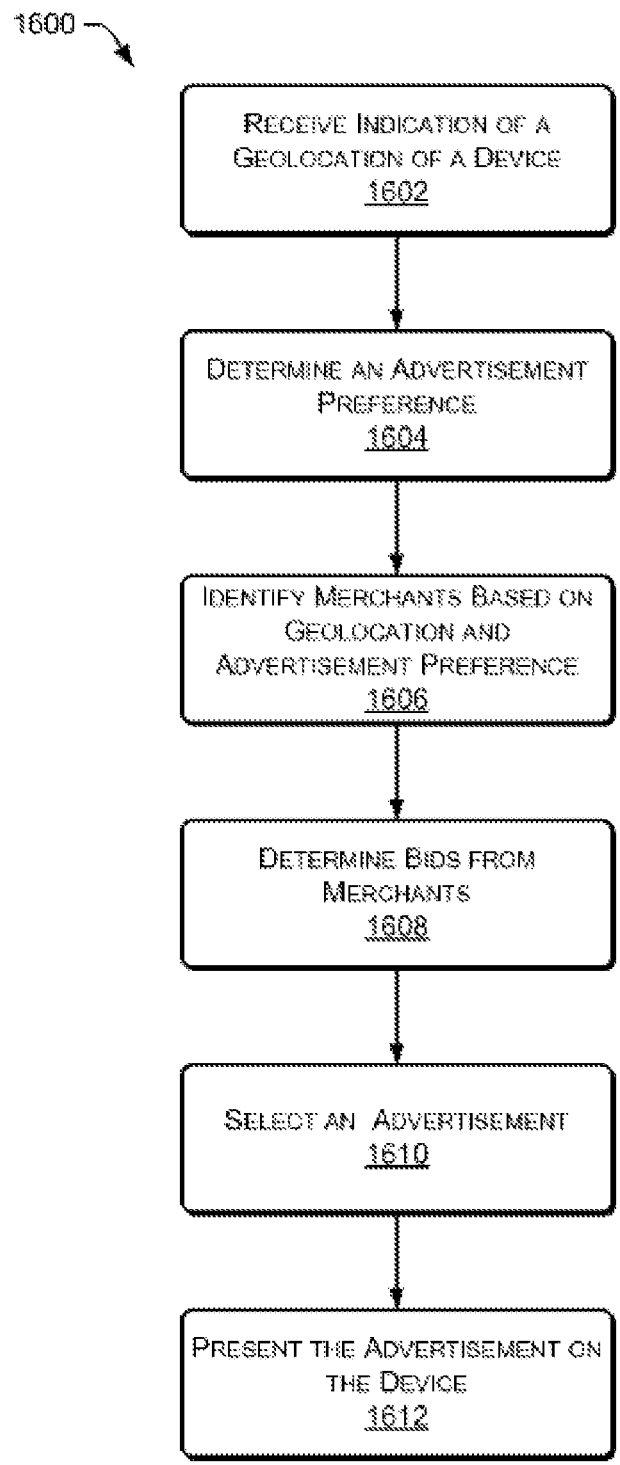
FIG. 6 is a flow diagram of an illustrative process for presenting advertisements on a mobile device based on bids submitted by merchants.

FIG. 6 illustrates process 1600 for presenting advertisements on a device based on coupon discounts submitted by merchants. At operation 1602, an indication of a geolocation of a mobile device is received. The geolocation may be determined in reference to the satellite 112 illustrated in FIG. 15. At operation 1604, an advertisement discount coupon preference of a user of the mobile device is determined. The system may be configured so that a user receives no advertisements unless a user affirmatively opts in to receive advertisements. The user preference information may be part of a user profile such as user profile 404 illustrated in FIGS. 4-5. The advertisement preference may also specify which categories of advertisements and from which merchants the user is willing to receive advertisements. In some implementations, a list of trusted merchant(s) 408 may determine the merchants that are able to send advertisements to the user. The advertising preferences may comprise any other type of user information. For example, the user information may include information about past transactions between the user and the merchant. This may be used to create targeted advertisements, for example, by telling the user about items that he or she purchased in the past and may wish to purchase again (e.g., tall latte) or about related items that the user may also wish to purchase (e.g., you purchased a chili dog for lunch, would you like to purchase antacids at our nearby drugstore?), any other market or target market, e.g., but not limited to, legally allowed category, e.g., but not limited to gender, age, demographic, cultural affiliation, sexual orientation or identity, buying, shopping, and/or browsing preferences or history.

Next, at operation 1606, merchants are identified based on the geolocation of the mobile device and on the advertisement preference of the user. The identified merchants may include only merchants within a specified distance from the mobile device. This can limit the possible source of advertisements to only those merchants that are located proximate to the geolocation of the mobile device. For example, if the user is walking down a street lined with restaurants, restaurants along that street may be eligible to advertise on the mobile device but restaurants located across town would not. A threshold or radius within which merchants are identified as being proximate to the mobile device may vary based on the type of advertisement. For example, restaurant advertisements may only be sent to mobile devices that are within a quarter mile of the restaurant geolocation. However, hotel advertisements may be sent to users with mobile devices within five miles of the hotel geolocation. Additionally, the advertisements may be sorted by time such that restaurant advertisements may be more common or cover a larger geographic area in the hours before dinner time and hotel advertisements may cover a larger geographic area earlier in the day but progressively narrow the geographic focus as it becomes night.

Once a pool of merchants has been identified based on at least geolocation and advertisement preference, coupons are received from those merchants at operation 1608. The coupon offers may be received and processed by the module 312 illustrated in FIG. 3. Each of the coupon offers may include different factors that the merchant is providing.

At operation 1610, a time limited, reservable coupon card advertisement is selected. The selected advertisement may be determined based on user preferences and/or other factors. Next, at operation 1612, the selected advertisement is presented on the mobile device in the form of coupon cards. The advertisement may be supplied from the advertisement database 126 illustrated in FIGS. 4 and 5. More specifically, the advertisement may be generated based on the advertisement content 416 illustrated in FIG. 4-5. The advertisement may be presented on the mobile device as a banner, in a specialized ad window, or the like. In some implementations, the advertisement may be integrated with a map so that the user can easily identify the location of the merchant that corresponds to the advertisement. The advertisements may remain on the mobile device for variable periods of time. Some advertisements may expire after a fixed amount of time such as one minute. Advertisements may also expire based on geolocation of the mobile device so that when the mobile device leaves a geolocation near the merchant, that merchant's advertisement is replaced by a different advertisement.

Figure 7:
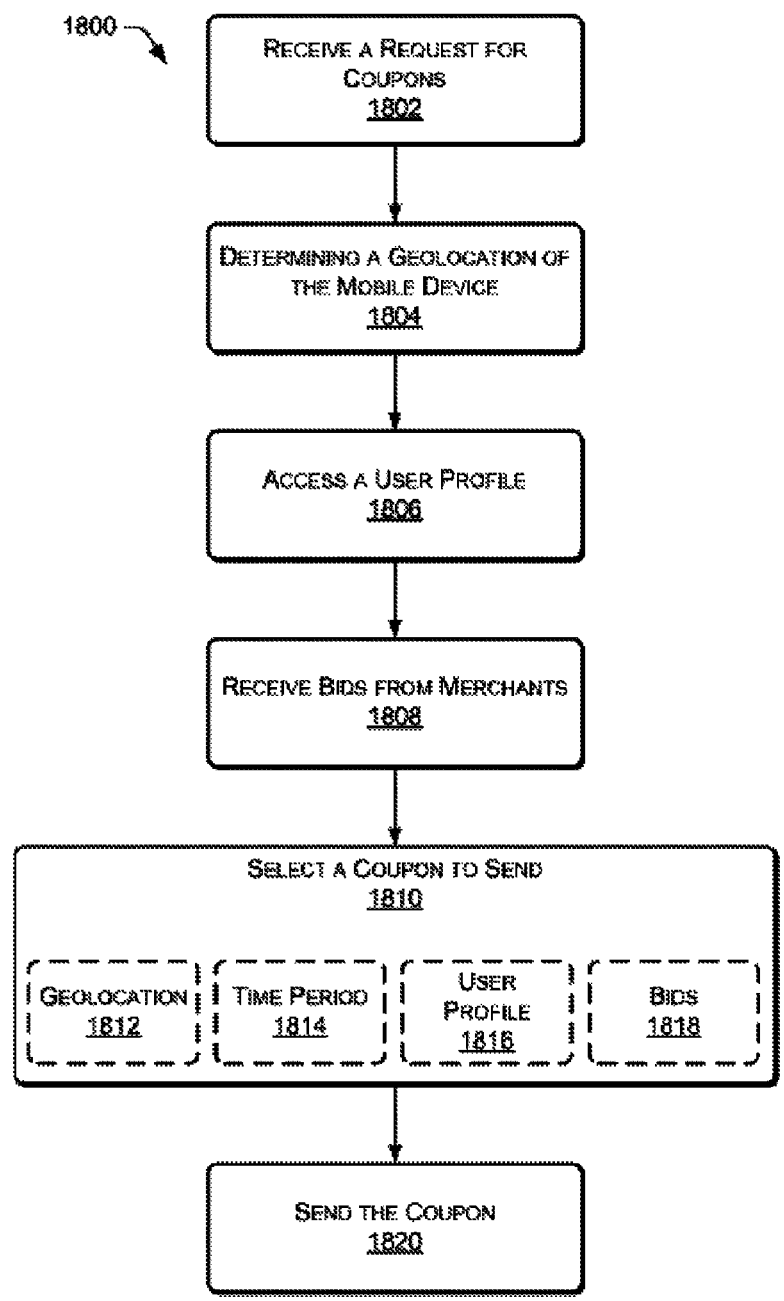
FIG. 7 is a flow diagram of an illustrative process for sending a coupon to a mobile device.

FIG. 7 illustrates process 1800 for providing geo-relevant coupons to a mobile device. Coupons represent one type of promotion or advertisement that may be sent from merchants to mobile devices. Geo-relevant coupons can be thought of as relevant to a particular location when a merchant that accepts the coupon is located nearby. When a user is presented with coupons that are relevant to his or her current location, as opposed to all available coupons, the friction associated with selecting and using a coupon is minimized, and the coupon further provides incentives by providing a selection from several to many coupon cards that have time limits and limited reservation capabilities. The incentive of receiving a discount by using the coupon combined with geographic proximity of the merchant may encourage users who would otherwise bypass a merchant to stop in and make a purchase.

At operation 1802, a computing device such as the server 118 shown in FIG. 1 may receive a request for one or more coupons that are relevant to a geolocation of the mobile device. In some implementations, a user of the mobile device may initiate the communication by pressing, for example, a "send me coupons" button. In other implementations, the communication may be initiated automatically by the mobile device. For example, the user may have previously indicated a willingness to receive geo-relevant coupons when such coupons become available.

At operation 1804, the geolocation of the mobile device is determined. The geolocation may be determined by the location sensor 230 of FIG. 2 using, for example, GPS technology.

At operation 1806, a user profile such as the user profile 404 shown in FIG. 4 may be accessed by, for example, the server 118. The user profile may contain information about the user such as a wish list of goods or services for which the user has previously expressed interest. The wish list may be a list of things that the user wishes to purchase for himself or herself or the wish list could be a shopping list or a lists of gifts to buy for other people. The user profile may also contain a transaction record such as the transaction record 406 shown in FIG. 4. The transaction record may identify goods or services that the user previously purchased.

In some implementations, the user profile may also include a "home location" for the user. This may be a geolocation of the user's home, workplace, or another location specified by the user.

At operation 1808, offers for the privilege of sending a coupon to the mobile device may be received from merchants.

The coupon may function as a form of advertising and merchants that wish to send coupons to the mobile device may be charged for sending coupons. In some implementations, the merchant with the highest bid may be allowed to send coupons to the mobile device. Rather than bidding, the merchants may also submit coupons to a coupon repository such as the advertisement database 126 shown in FIG. 4. Coupons may be selected from the coupon repository and sent users that may be interested in the coupons.

At operation 1810, geo-relevant coupon cards are selected to be sent to the mobile device. The geo-relevant coupons may be selected from the coupon repository. The selection may be based on the geolocation 1812 of the mobile device. The selected coupon is geo-relevant because it is redeemable at a merchant location that is relatively nearby the current location of the mobile device. As discussed above, the concept of "near" may be determined by presence of the mobile device within a predetermined proximity of a merchant location. The selection may also be based on the home location of the user. For example, the user may receive coupons on his or her mobile device for merchants within a predetermined proximity of the home location even when the mobile device is not located at that home location.

In some implementations, other factors may also be used to select the coupon. For example, a coupon may have a limited time span during which it is valid. A coupon for a restaurant may only be valid from Sunday to Thursday. A coupon for a coffee shop may only be valid after 11:00 AM. Thus, the user may need to be at the right place (i.e., geolocation) and be there at the right time in order to use a coupon. Thus, sending a coupon to the user that cannot be used in the near future either because of geographic or temporal limitations may be frustrating and of limited use to the user. Therefore, the operation 1810 may also select the geo-relevant coupon based on a time period 1814 for which the geo-relevant coupon is valid.

A merchant may also determine the validity period for a coupon based on known or forecast excess capacity of the merchant. For example, a merchant that provides services on a reservation basis (e.g., a beauty shop, a spa, a restaurant, etc.) may know that there are few reservations relative to capacity for some upcoming time period. Rather than have beauticians, masseuses, or chefs sit idle, the merchant may choose to create coupons or other discount to increase customers. The coupons may be sent out on a just-in-time basis such as the merchant realizes that current or projected customers are fewer than desired.

Additionally, the user profile 1816 may be used to select a geo-relevant coupon to send to the mobile device. If the user profile includes a wish list, a coupon for a good or service included on the wish list may be selected. Similarly, if the user profile 1816 includes a transaction record, the coupon sent to the mobile device may be based on the transaction record. For example, inferences may be made about what the user is likely to buy in the future based on past purchases recorded in the transaction record. Therefore, coupons for goods or services that are likely of interest to the user may be selected based on the transaction record, or optionally using one or more of other mechanisms, processes, locations, notifications, and the like, e.g., but not limited to push or other notifications, in real time or scheduled or set, including optional free or discounted products or services, that can include a company logo, URL, and/or QR code for the coupon or advertisement provider, or the product or service provider, retailer, manufacturer, and/or distributor. As a non-limiting example, if the user walks past a shoe store, they might then receive a coupon, advertisement or notification that they can get a discounted or free pair of socks.

Selecting the coupon to send to the mobile device may also be based on bids 1818 received from the merchants at operation 1808. For example, if the mobile device is near to competing merchants, those merchants may wish to send their coupon to the mobile device and prevent the competitor from sending a coupon. Thus, the bids 1808 may be an additional factor used in selecting the coupon to send to the mobile device. In some implementations, the winning merchant may not pay the bid amount unless the user actually redeems the coupon. Any combination of the above factors (e.g., geolocation 1812, time period 1814, user profile 1816, and/or bids 1818) may be used to select the coupon to send to the mobile device.

At operation 1820, the selected geo-relevant coupon is sent to the mobile device. The coupon may be sent wirelessly as a signal from, for example, the radio antenna 114 shown in FIG. 1.

Figure 8:
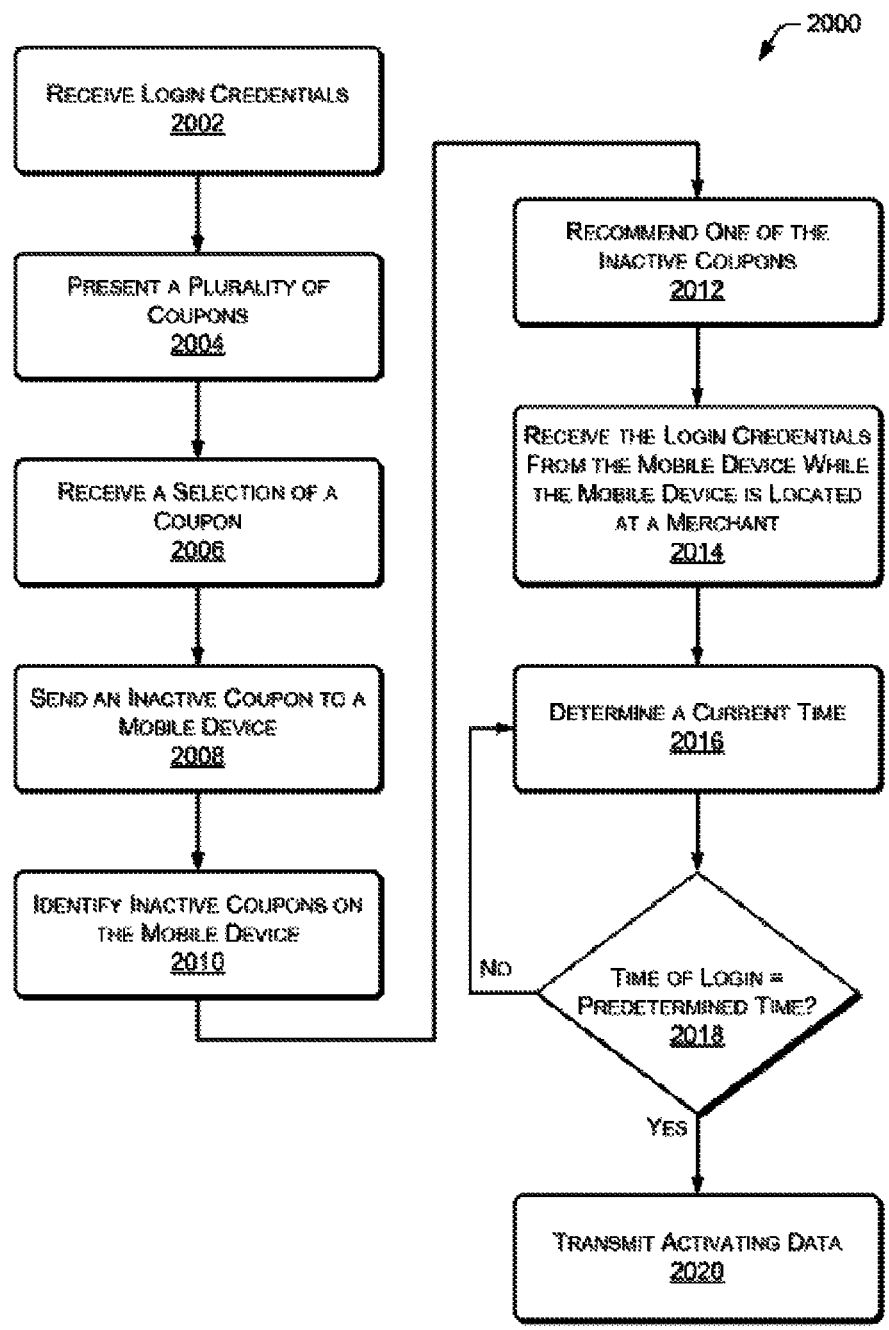
FIG. 8 is a flow diagram of an illustrative process for activating a coupon on a mobile device in response to a user login.

FIG. 8 illustrates process 2000 for activating a coupon on a mobile device in response to a user of the mobile device logging in to a server or other computing device. In some implementations, the user may wish to select and download coupons to his or her mobile device in advance. One way of doing this may involve the user accessing an account from a desktop computer, or some other computing device that may be different than the mobile device, and selecting coupons that are then pushed to the mobile device or associated with a unique identifier of the user and later retrieved from the mobile device. The user may also perform the initial selection of coupons from the mobile device itself.

At operation 2002, login credentials of the user are received. The login credentials may be entered from the mobile device or from another computing device such as a desktop computer. In some implementations, the login credentials may also indicate membership in a group that has special privileges or otherwise could receive coupons different from those provided to users who are not members of the group. For example, a coupon redeemable at a store where membership is required (e.g., Costco, Bi-Mart, etc.) may only be sent to users that are members. The login credentials of the user may also be associated with the transaction record of the user.

At operation 2004, a plurality of coupons available on a network-accessible database such as, for example, the advertisement database 126 shown in FIG. 4 may be presented to the user. The network-accessible database may be accessible through the Internet and presented in a user interface as a webpage. In other implementations, the network-accessible database may be implemented like an app store (or in this case a "coupon store") that is available from a limited network such as a network operated by a mobile phone service provider. The network-accessible database may also be accessed automatically by systems of the mobile device or of the server(s) and the user may not access the database but rather receive a coupon or recommended from the database. In some implementations, the plurality of coupons recommended to the user may be a personalized sub-set of all available coupons. The personalization may be achieved by filtering a larger set of coupons based on user information such as the user information 120 shown in FIG. 4, which can optionally further include wherein the user can stop, delete, remove, and the like by interaction with the mobile device, e.g., swiping up on the display of the coupon on the touch screen and designate whether or not they would like to save or display the coupon in the future, optionally further comprising wherein the server provides functionality to record and analysis a users input relating to the coupons that is used to help select and/or target future coupons or advertisements to the user.

At operation 2006, a selection by the user of a coupon redeemable at a merchant from the plurality of coupons is received. The user may also select more than one coupon at a time.

At operation 2008, an inactive version of the coupon may be sent to the mobile device. The inactive version may be a placeholder or abbreviated representation of the coupon. This may be characterized by having a small file size but also uniquely identifying the coupon itself. The inactive version may also be implemented by providing a complete coupon with all the information necessary for the coupon to be redeemed, but blocking or otherwise inactivating the coupon until a code, token, key, or similar data to activate the coupon is provided.

At operation 2010, coupons for which inactive versions are present on the mobile device may be identified. This may be thought of as creating a list of those coupons that the user has already downloaded to his or her device and are ready to be used once activated.

At operation 2012, one of the inactive coupons identified at operation 2010 may be recommended to the user. The recommendation may be based on any number of factors such as the geolocation of the mobile device, the transaction record of the user, and the like. The user may forget which coupons he or she has available on his or her mobile device or the user may not realize that a merchant for which he or she has already downloaded a coupon is nearby. Recommending a coupon to the user may help the user fully utilize his or her coupons.

At operation 2014, the login credentials are received from the mobile device while the mobile device is located within a predetermined proximity of the merchant. For example, after arriving as a merchant (or at the parking lot in front of the merchant) the user may manually enter his or her login credentials in order to access a coupon, inform the merchant that he or she has arrived, or for another reason. In some implementations, the user may set the mobile device to automatically send a message when the mobile device enters the predetermined proximity of the merchant. By providing the user login credentials automatically, friction involved with redeeming a coupon may be reduced, optionally provided by links or interaction with social media sites or services, e.g., Facebook™, Twitter™, Instagram™, LinkedIn™ and the like.

At operation 2016 a current time is determined. The current time may be determined by the calendar/clock 228 shown in FIG. 2. In some implementations the current time may be the time when the login credentials are received in operation 2014.

At decision point 2018, a time of receiving the login credentials of the mobile device may be compared with a predetermined time. When the time of receiving the login credentials matches the predetermined time, process 2000 follows the "yes" path and proceeds to operation 2020. When the time of receiving the login credentials does not match the predetermined time, process 2000 follows that "no" path and returns to operation 2016 to re-determine the current time. In implementation in which providing the login credentials serves to determine the time, the user may need to re-enter or re-transmit login credentials to reset the current time.

At operation 2020, data that activates the coupon is transmitted to the mobile device. The data may be a code, a token, a key, or the like. Once activated, the user may elect to use a coupon by presented to the merchant either as a visual image shown on a display of the mobile device (e.g., a barcode or another code that an employee enters into a point-of-sale terminal) or in some implementations the coupon can be optionally implemented manually, as partially or fully automated, or automatically applied, when the user makes a visit to the retail store or purchase using the mobile device or in the store.

The present location profile and/or the set of adjacent profiles can optionally be refreshed in the mobile device at the periodic interval. The wiki interface that enables the user of the mobile device to add profiles and/or to modify any information associated with the present sense profile and/or the set of adjacent profiles can optionally be provided when the present sense profile and/or the set of adjacent profiles are not claimed by another user. Also, certain profiles can optionally be locked (e.g., when they have been claimed by a claiming user at the discretion of the claiming user).

Coupons provided by the businesses in the vicinity of the present geographic location of the mobile device can optionally be generated in the mobile device. Temporary messages can optionally be created through the mobile device that can optionally be coordinated based on the positioning information of the mobile device to the geo-spatial network location and which resides in the geo-spatial network only for the threshold amount of time prior to being purged from the geo-spatial network. The markers (e.g., visible around profiles of adjacent businesses and/or residences) can optionally be generated in the geo-spatial network to represent the temporary messages.

In the exemplary optional embodiments, the user interface view can optionally enable the user to navigate in the different directions and to position the present location and/or the set of adjacent locations surrounding the mobile device of the user. Furthermore, the triangulation algorithm (e.g., the global positioning algorithm and/or the radio algorithm) can optionally be applied to generate the compass view in the mobile device that represents adjacent profile as being in front of, behind, to the left of, and to the right of the mobile device.

In addition, it will be appreciated that the various operations, processes, and methods disclosed herein can optionally be embodied in a computer system-readable non-transitory medium and/or a computer system accessible non-transitory medium compatible with a data processing system (e.g., a computer system), and can optionally be performed in any order. Accordingly, the specification and drawings are to be regarded in an illustrative rather than a restrictive sense.

EXAMPLE 1

In a non-limiting optional example, the invention optionally provides one or two or more coupons, discounts, sales, and/or deals (hereinafter, "deal") available to reserve and redeem, wherein a user reserves a nearby or location based deal by browsing through the deal cards on the display of an internet device (e.g., but not limited to a smart phone) and tapping or designating the deal they are interested in reserving. Tapping the deal card displays the deal detail view which optionally includes a "Reserve" button. When the user taps the reserve button the system checks that the user hadn't already reserved the deal and that there is still a reservation available. If there is a reservation available, the system creates a reservation record associated with the user and the deal. The reservation record optionally includes created at and/or expires at timestamps. The user interface of the application tells the user how much time they have to redeem their reservation and their distance from the physical location of the deal. The user cannot leave the reservation screen (to reserve another deal) unless they cancel their current reservation (which will be released back into the available reservation pool). The expires at time can be extended by various actions taken by the users, including but not limited to sharing the deal with friends or posting a photo to social non-transitory media. To redeem the reservation the user must be within a certain distance of the deal's physical location (geo fence) before the reservation expires at time has passed. If the application is open and running it will show the user their distance and time remaining. If the application is closed or in the background, a geofence will send a local notification to the user when they have arrived at the location if the reservation time hasn't expired. Once the user is within the allocated distance to redeem and the reservation hasn't expired, it will automatically check them in and mark the deal as "redeemed" enabling the user to prove they made it on time even if there isn't staff available to verify the on time arrival. The proof of redemption will include a profile picture, tag, motion enabled watermark, or other visual, 2D or security mechanism, of the user to prevent fraud. If the user fails the get near enough to the deal location before the expires at time, the reservation will expire and the go back into the available reservation pool.

What is claimed is:

1. A method for providing location based, mobile device, user selected time, location, and number limited automatic location based reserve and redeem discounts using electronic coupon cards for products or services with profile picture, tag, motion enabled watermark, or visual, 2D tag, or URL code security, the method comprising:

(a) electronically communicating via a network comprising a wireless network positioning data of the mobile device to non-transitory media on a computer based server at a periodic interval;

(b) automatically and electronically generating via a processor in the mobile device, in response to electronic communications data from the server, present location profile data associated with a present geographic location of the mobile device;

(c) automatically and electronically generating via a processor in the mobile device or the server, in response to electronic communications data from the server, user profile data associated with the user of the mobile device, wherein the user profile data comprises a picture of the user and profile information of the user that is used by the server to determine, using a subroutine, types of products or services of potential interest to the user;

(d) simultaneously and electronically generating via a processor in the mobile device, a set of data of adjacent location profiles of nearby businesses provided by the server as being geographically near to the present geographic location of the mobile device;

(e) electronically refreshing, in the mobile device and the server, present location profile data and the set of adjacent location profiles at periodic intervals;

(f) electronically generating, in the mobile device and the server, an electronic or graphical representation of a limited number of reservations in a reservation pool for each coupon card for discounts on the products or services of potential interest to the user or other users, wherein each discount provided by a coupon card is reservable by multiple users of mobile devices, and is reservable by the user of the mobile device, by tapping the display of the coupon card displayed on the one of the multiple users' or the user's mobile device;

wherein the discounts on the coupons provided to users, from nearby businesses provided by the server as being geographically near to the present geographic location of the mobile device, wherein the coupons are provided to multiple users in a preset, limited number of reservable coupons;

wherein the coupon cards displayed to the user of the mobile device have a display of a reserve button for the user to push on the touch screen of the mobile device to reserve the coupon for a preset period or periods of time, wherein the user can select only one coupon reservation at a time, wherein any non-selected or additional coupon reservation will be returned to the reservation pool upon selection of the reservation of one of the coupon cards and coupon;

wherein said time is date stamped or displayed on the display of the users' mobile device as created/begun and limit/expiration times, wherein the limit/expiration time determines by which time the product or service has to: (i) be purchased by the user; (ii) shared with friends or posted to social media; or (iii) the user has to arrive at a business in a vicinity of the present geographic location of the mobile device; in order for the user to receive the discount on the coupon for the product or service;

wherein the coupons cards are for discounts on at least 3 products or services;

wherein the coupon cards are displayed in the form of coupon cards on a touch screen display of the mobile device for the user to view and select from by touching the screen of the display of the mobile device one or more selected coupons, wherein the coupons providing a discount on the desired products or services are sold by the business in a vicinity of the present geographic location of the mobile device;

(g) electronically reserving on the mobile device the coupon through a mobile application or routine on the mobile device when the user views and selects the coupon for a product or service associated with the coupon;

(h) electronically reserving the product or service at the business in the vicinity of the present geographic location of the mobile device;

wherein the mobile device displays the time limit for purchasing the product or service, which selected coupon is then associated with a user profile having a picture of the user;

wherein the reservation for the coupon expires if the user does not arrive at a preset distance from the business and purchase the product or service, before the limit/expiration time;

(i) locking certain coupons when they have been reserved by a user;

(j) electronically notifying the user when the user is within a preset distance of the location of the business selling the product or service corresponding to the coupon selected by the user;

(k) electronically redeeming on the mobile device or a computer system of the business the coupon through an electronic payment system provided either on the mobile device or by the business, when the user purchases the product or service associated with the coupon providing the associated discount in price for the product or service when the user purchases the product or service within the time limit which was displayed on the device when the user selected the coupon;

(l) validating the discount provided by the coupon for the user of the coupon by use of the user's profile picture, tag, motion enabled watermark, or visual, 2D tag, or URL code security verification by the business selling the product or service; and (m) providing to one or more of said users at least one of an aggregate savings calculator for the user and other users selected by the user and a leaderboard that tracks other of said users and displays the quantitative use of the method as the number of coupons reserved or redeemed by the user and by other users in the same vicinity of reserved or redeemed coupons.

2. The method of claim 1, further comprising automatically attaching present location data in the present location profile when the server selects coupon cards based on location to be displayed on the mobile device that are nearby the location of the mobile device.

3. The method of claim 2, wherein the coupons do not display and offer travel, hotel, motel, or vehicle rental reservations.

4. The method of claim 2 wherein the set of adjacent profiles include business listings.

5. The method of claim 4 further comprising applying a triangulation algorithm to generate a compass view in the mobile device that represents each adjacent profile as being in front of, behind, to the left of, and to the right of the mobile device.

6. The method of claim 1 further comprising generating the positioning data using a positioning algorithm, wherein the positioning algorithm is at least one of a global positioning algorithm and a radio or mobile phone network positioning algorithm.

7. The method of claim 1 wherein the coupons do not display and offer bidding for online auctions.

8. The method of claim 1 wherein the coupons do not display and offer rebates on products or services.

9. The method of claim 1 wherein the coupons do not display and offer online products or services.

10. The method of claim 1 wherein the coupons do not display and offer products or services that are not sold in the vicinity of the mobile device.

11. The method of claim 1 further comprising generating directions between the mobile device and an adjacent business location offering one or more of said coupons without requiring a user of the mobile device to enter a starting address by applying a directions algorithm based on the positioning data of the mobile device as the starting address and a destination address identified in a particular adjacent profile associated with the adjacent business location.

12. The method of claim 1 further comprising viewing the present location profile and the set of adjacent location profiles of the mobile device in at least one of a satellite mode, a three-dimensional mode, and a flat-text mode.

13. The method of claim 1 wherein the user of the mobile device views the present location profile and the set of adjacent location profiles of the mobile device in a satellite mode, a three-dimensional mode, and a flat2D map or text mode.

14. The method of claim 1 further comprising: creating a temporary message through the mobile device that is coordinated based on the positioning information of the mobile device to a geo-spatial network location and which resides in the geo-spatial network only for a threshold amount of time prior to being purged from the geo-spatial network; and generating a marker visible around profiles of adjacent businesses and residences in the geo-spatial network that represents the temporary message.

15. A method of claim 1, wherein said method further comprises electronically sending via web or email coupons or discounts to said user based on one or more of the user's redemption history, demographics and taste.

16. A non-transitory machine-readable medium embodying a set of instructions that, when executed by a computer system, causes the computer system to perform the method of claim 1.

17. A system for providing location based, mobile device, user selected time, location, and number limited automatic location based reserve and redeem discounts using electronic coupon cards for products or services with profile picture, tag, motion enabled watermark, or visual, 2D tag, or URL code security verification, the system comprising:

a computer based network server and at least one mobile device operating through a mobile communications infrastructure, in which user profiles of network users of the network are editable by any network user; and mobile device used by network users that to generate a location profiles of the users and location and product and service profiles of businesses that the server can associate, including a threshold radius away from the mobile device location and the business locations and product and services by attaching location data of the mobile device acquired through a positioning module of the mobile device through the network; the server or mobile device comprising an advertising coupon card module (advertising module) to capture or generate coupons from businesses and residents surrounding the mobile device and to share them with a user of the mobile device an electronic electronically communicating via a network comprising a wireless network positioning data of the mobile device to non-transitory media on a computer based server at a periodic interval; and at least one processor in the mobile device or server that:
(a) automatically and electronically generates, in response to electronic communications data from the server, present location profile data associated with a present geographic location of the mobile device;
(b) automatically and electronically generates, in response to electronic communications data from the server, user profile data associated with the user of the mobile device,
wherein the user profile data comprises a picture of the user and profile information of the user that is used by the server to determine using a subroutine types of products or services of potential interest to the user;
(c) simultaneously and electronically generates a set of data of adjacent location profiles of nearby businesses provided by the server as being geographically near to the present geographic location of the mobile device;
(d) electronically refreshes present location profile data and the set of adjacent location profiles at periodic intervals;
(e) electronically generating an electronic or graphical representation of a limited number of reservations in a reservation pool for each coupon card for discounts on the products or services of potential interest to the user or other users,
wherein each discount provided by a coupon card is reservable by multiple users of mobile devices, and is reservable by the user of the mobile device. by tapping the display of the coupon card displayed on the one of the multiple users' or the user's mobile device;
wherein the discounts on the coupons provided to users, from nearby businesses provided by the server as being geographically near to the present geographic location of the mobile device, wherein the coupons are provided to multiple users in a preset, limited number of reservable coupons;

wherein the coupon cards displayed to the user of the mobile device have a display of a reserve button for the user to push on the touch screen of the mobile device to reserve the coupon for a preset period or periods of time, wherein the user can select only one coupon reservation at a time, wherein any non-selected or additional coupon reservation will be returned to the reservation pool upon selection of the reservation of one of the coupon cards and coupon;

wherein said time is date stamped or displayed on the display of the users' mobile device as created/begun and limit/expiration times, wherein the limit/expiration time determines by which time the product or service has to be purchased by the user and the user has to arrive at a business in a vicinity of the present geographic location of the mobile device, to receive the discount on the coupon for the product or service;

wherein the coupons cards are for discounts on at least 3 products or services;

wherein the coupon cards are displayed in the form of coupon cards on a touch screen display of the mobile device for the user to view and select from by touching the screen of the display of the mobile device one or more selected coupons, wherein the coupons providing a discount on the desired products or services are sold by the business in a vicinity of the present geographic location of the mobile device;

(f) electronically reserving the coupon through a mobile application or routine on the mobile device when the user views and selects the coupon for a product or service associated with the coupon;

(g) electronically reserving the product or service at the business in the vicinity of the present geographic location of the mobile device;

wherein the mobile device displays the time limit for purchasing the product or service, which selected coupon is then associated with a user profile having a picture of the user;

wherein the reservation for the coupon expires if the user does not arrive at a preset distance from the business, or purchase the product or service, before the limit/expiration time;

(h) locking certain coupons when they have been reserved by a user;

(i) electronically notifying the user when the user is within a preset distance of the location of the business selling the product or service corresponding to the coupon selected by the user;

(j) electronically redeeming on the mobile device or a computer system of the business the coupon through an electronic payment system provided either on the mobile device or by the business, when the user purchases the product or service associated with the coupon providing the associated discount in price for the product or service when the user purchases the product or service within the time limit which was displayed on the device when the user selected the coupon;

(k) validating the discount provided by the coupon for the user of the coupon by use of the user's profile picture, tag, motion enabled watermark, or visual, 2D tag, or URL code security verification by the business selling the product or service; and (l) providing to one or more of said users at least one of an aggregate savings calculator for the user and other users selected by the user and a leaderboard that tracks other of said users and displays the quantitative use of the method as the number of coupons reserved or redeemed by the user and by other users in the same vicinity of reserved or redeemed coupons.

18. The system of claim 17, further comprising an advertising coupon card module (advertising module) to capture advertisements, messages, and coupons from businesses surrounding the mobile device and to share them with a user of the mobile device via said coupon cards.

* * * * *